US008237673B2

(12) United States Patent
Jiang et al.

(10) Patent No.: US 8,237,673 B2
(45) Date of Patent: *Aug. 7, 2012

(54) TOUCH PANEL AND DISPLAY DEVICE USING THE SAME

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 586 days.

This patent is subject to a terminal disclaimer.

(21) Appl. No.: 12/286,178

(22) Filed: Sep. 29, 2008

(65) Prior Publication Data

US 2009/0153510 A1    Jun. 18, 2009

(30) Foreign Application Priority Data

Dec. 14, 2007   (CN) .......................... 2007 1 0125118

(51) Int. Cl.
 *G06F 3/041* (2006.01)
(52) U.S. Cl. ........ 345/173; 313/582; 313/336; 428/339; 257/222
(58) Field of Classification Search .................. 345/173; 524/496; 257/222; 349/12; 313/336; 428/339
See application file for complete search history.

(56) References Cited

U.S. PATENT DOCUMENTS

| 4,659,873 | A | 4/1987 | Gibson et al. |
|---|---|---|---|
| 4,922,061 | A | 5/1990 | Meadows et al. |
| 4,933,660 | A | 6/1990 | Wynne, Jr. |
| 5,181,030 | A | 1/1993 | Itaya et al. |
| 5,853,877 | A | 12/1998 | Shibuta |
| 5,861,583 | A | 1/1999 | Schediwy et al. |
| 6,373,472 | B1 | 4/2002 | Palalau et al. |
| 6,423,583 | B1 | 7/2002 | Avouris et al. |
| 6,628,269 | B2 | 9/2003 | Shimizu |
| 6,629,833 | B1 * | 10/2003 | Ohya et al. ............. 425/458 |
| 6,914,640 | B2 | 7/2005 | Yu |
| 6,947,203 | B2 | 9/2005 | Kanbe |

(Continued)

FOREIGN PATENT DOCUMENTS

CN          2539375          3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003,32(8)(lines from the 4th line to 35th line in the right column of p. 507 may be relevant).

(Continued)

*Primary Examiner* — Peter Macchiarolo
*Assistant Examiner* — Mary Ellen Bowman
(74) *Attorney, Agent, or Firm* — Altis Law Group, Inc.

(57) ABSTRACT

A touch panel includes a first electrode plate and a second electrode plate. The first electrode plate includes a first substrate, and a first conductive layer disposed on a lower surface of the first substrate. The second electrode plate includes a second substrate, and a second conductive layer disposed on an upper surface of the second substrate. The first conductive layer and the second conductive layer both include a carbon nanotube layer. Each carbon nanotube layer includes a plurality of carbon nanotubes. The first substrate and the second substrate are flexible. Further, the present invention also relates to a display device. The display device includes a displaying unit and a touch panel.

15 Claims, 5 Drawing Sheets

U.S. PATENT DOCUMENTS

| | | | |
|---|---|---|---|
| 7,054,064 B2 | 5/2006 | Jiang et al. | |
| 7,060,241 B2 | 6/2006 | Glatkowski | |
| 7,084,933 B2* | 8/2006 | Oh et al. | 349/12 |
| 7,196,463 B2 | 3/2007 | Okai et al. | |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,532,182 B2 | 5/2009 | Tseng et al. | |
| 7,593,004 B2 | 9/2009 | Spath et al. | |
| 7,630,040 B2 | 12/2009 | Liu et al. | |
| 7,662,732 B2 | 2/2010 | Choi et al. | |
| 7,663,607 B2 | 2/2010 | Hotelling et al. | |
| 7,704,480 B2 | 4/2010 | Jiang et al. | |
| 7,710,649 B2 | 5/2010 | Feng et al. | |
| 7,796,123 B1 | 9/2010 | Irvin, Jr. et al. | |
| 7,825,911 B2 | 11/2010 | Sano et al. | |
| 7,854,992 B2 | 12/2010 | Fu et al. | |
| 7,947,977 B2 | 5/2011 | Jiang et al. | |
| 2002/0089492 A1 | 7/2002 | Ahn et al. | |
| 2003/0122800 A1* | 7/2003 | Yu | 345/173 |
| 2003/0147041 A1 | 8/2003 | Oh et al. | |
| 2003/0189235 A1 | 10/2003 | Watanabe et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0151195 A1 | 7/2005 | Kawase et al. | |
| 2005/0209392 A1* | 9/2005 | Luo et al. | 524/496 |
| 2006/0010996 A1* | 1/2006 | Jordan et al. | 73/866.1 |
| 2006/0022221 A1* | 2/2006 | Furukawa et al. | 257/222 |
| 2006/0044284 A1 | 3/2006 | Tanabe | |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1* | 12/2006 | Spath et al. | 345/173 |
| 2006/0274049 A1 | 12/2006 | Spath et al. | |
| 2006/0275956 A1* | 12/2006 | Konesky | 438/128 |
| 2006/0278444 A1 | 12/2006 | Binstead | |
| 2007/0065651 A1 | 3/2007 | Glatkowski et al. | |
| 2007/0075619 A1 | 4/2007 | Jiang et al. | |
| 2007/0081681 A1 | 4/2007 | Yu et al. | |
| 2007/0099333 A1 | 5/2007 | Moriya | |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 | 12/2007 | Hata et al. | |
| 2008/0029292 A1 | 2/2008 | Takayama et al. | |
| 2008/0088219 A1 | 4/2008 | Yoon et al. | |
| 2008/0129666 A1 | 6/2008 | Shimotono et al. | |
| 2008/0138589 A1 | 6/2008 | Wakabayashi et al. | |
| 2008/0192014 A1* | 8/2008 | Kent et al. | 345/173 |
| 2008/0238882 A1 | 10/2008 | Sivarajan et al. | |
| 2008/0266273 A1 | 10/2008 | Slobodin et al. | |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |
| 2010/0001972 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |

| | | |
|---|---|---|
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | 200722559 | 6/2007 |
| TW | 200727163 | 7/2007 |
| TW | 284927 | 8/2007 |
| TW | 200729241 | 8/2007 |
| TW | 200737414 | 10/2007 |
| TW | 200738558 | 10/2007 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yu Xiang, Technique of Touch Panel & the Production of Resistance-type Touch Panel Insulation Dot, Journal of Longyan Teachers College, p. 25-26, vol. 22, No. 6, 2004.

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

Mei Zhang etal., "Strong Transparent, Multifunctional, Carbon Nanotube Sheets", Science, America, AAAS, vol. 309, pp. 1215-1219, Aug. 19, 2005.

George Gruner, "Carbon Nanonets Spark New Electronics", Scientific American, pp. 76-83, May 2007.

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

ASM Handbook."vol. 2 Properties and Selection: Nonferrous Alloys and Special-Purpose Materials".Apr. 2007; pp. 840-853.

Wu et al."Transparent, Conductive Carbon Nanotube Films". Science,vol. 305,(2004);pp. 1273-1276.

Fan et al. "Self-Oriented Regular Arrays of Carbon Nanotubes and Their Field Emission Properties". Science, vol. 283, (1999); pp. 512-514.

Susuki et al."Investigation of physical and electric properties of silver pastes as binder for thermoelectric materials". Review of Scientific Instruments,76,(2005);pp. 023907-1 to 023907-5.

* cited by examiner

TOUCH PANEL AND DISPLAY DEVICE USING THE SAME

RELATED APPLICATIONS

This application is related to commonly-assigned applications entitled, "TOUCH PANEL", filed Sep. 29, 2008 (Ser. No. 12/286,266); "TOUCH PANEL", filed Sep. 29, 2008 (Ser. No. 12/286,141); "TOUCH PANEL AND DISPLAY DEVICE USING THE SAME", filed Sep. 29, 2008 (Ser. No. 12/286,154); "TOUCH PANEL AND DISPLAY DEVICE USING THE SAME", filed Sep. 29, 2008 (Ser. No. 12/286,189); "TOUCH PANEL AND DISPLAY DEVICE USING THE SAME", filed Sep. 29, 2008 (Ser. No. 12/286,176); "ELECTRONIC ELEMENT HAVING CARBON NANOTUBES", filed Sep. 29, 2008 (Ser. No. 12/286,143); "TOUCH PANEL AND DISPLAY DEVICE USING THE SAME", filed Sep. 29, 2008 (Ser. No. 12/286,166); "TOUCH PANEL AND DISPLAY DEVICE USING THE SAME", filed Sep. 29, 2008 (Ser. No. 12/286,181); "TOUCH PANEL AND DISPLAY DEVICE USING THE SAME", filed Sep. 29, 2008 (Ser. No. 12/286,148); "TOUCHABLE CONTROL DEVICE", filed Sep. 29, 2008 (Ser. No. 12/286,140); "TOUCH PANEL AND DISPLAY DEVICE USING THE SAME", filed Sep. 29, 2008 (Ser. No. 12/286,146); "TOUCH PANEL AND DISPLAY DEVICE USING THE SAME", filed Sep. 29, 2008 (Ser. No. 12/286,216); "TOUCH PANEL AND DISPLAY DEVICE USING THE SAME", filed Sep. 29, 2008 (Ser. No. 12/286,152); "TOUCH PANEL AND DISPLAY DEVICE USING THE SAME", filed Sep. 29, 2008 (Ser. No. 12/286,145); "TOUCH PANEL, METHOD FOR MAKING THE SAME, AND DISPLAY DEVICE ADOPTING THE SAME", filed 09/29/2008 (Ser. No. 12/286,155); "TOUCH PANEL AND DISPLAY DEVICE USING THE SAME", filed Sep. 29, 2008 (Ser. No. 12/286,179); "TOUCH PANEL, METHOD FOR MAKING THE SAME, AND DISPLAY DEVICE ADOPTING THE SAME", filed 09/29/2008 (Ser. No. 12/286,228); "TOUCH PANEL AND DISPLAY DEVICE USING THE SAME", filed Sep. 29, 2008 (Ser. No. 12/286,153); "TOUCH PANEL AND DISPLAY DEVICE USING THE SAME", filed Sep. 29, 2008 (Ser. No. 12/286,184); "METHOD FOR MAKING TOUCH PANEL", filed Sep. 29, 2008 (Ser. No. 12/286,175); "METHOD FOR MAKING TOUCH PANEL", filed Sep. 29, 2008 (Ser. No. 12/286,195); "TOUCH PANEL AND DISPLAY DEVICE USING THE SAME", filed Sep. 29, 2008 (Ser. No. 12/286,160); "TOUCH PANEL AND DISPLAY DEVICE USING THE SAME", filed Sep. 29, 2008 (Ser. No. 12/286,220); "TOUCH PANEL AND DISPLAY DEVICE USING THE SAME", filed Sep. 29, 2008 (12/286,227); "TOUCH PANEL AND DISPLAY DEVICE USING THE SAME", filed Sep. 29, 2008 (Ser. No. 12/286,144); "TOUCH PANEL AND DISPLAY DEVICE USING THE SAME", filed Sep. 29, 2008 (Ser. No. 12/286,218); "TOUCH PANEL AND DISPLAY DEVICE USING THE SAME", filed Sep. 29, 2008 (Ser. No. 12/286,142); "TOUCH PANEL AND DISPLAY DEVICE USING THE SAME", filed 12/29/2008(Ser. No. 12/286,241); "TOUCH PANEL, METHOD FOR MAKING THE SAME, AND DISPLAY DEVICE ADOPTING THE SAME", filed Sep. 29, 2008 (Ser. No. 12/286,151); and "TOUCH PANEL, METHOD FOR MAKING THE SAME, AND DISPLAY DEVICE ADOPTING THE SAME", filed Sep. 29, 2008 Ser. No. 12/286,219). The disclosures of the above-identified applications are incorporated herein by reference.

BACKGROUND

1. Field of the Invention

The present invention relates to touch panels and, particularly, to a carbon nanotube based touch panel and a display device using the same.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, stylus, or another like tool while visually observing the display device through the touch panel. Therefore, a demand exists for touch panels that are provide superior in visibility and reliable operation.

Up to the present time, different types of touch panels, including resistance, capacitance, infrared, and surface sound-wave types have been developed. Due to their higher accuracy and low-cost of production thereof, the resistance-type touch panels have been widely used.

A conventional resistance-type touch panel includes an upper substrate, a lower substrate, and a plurality of dot spacers. The upper substrate includes an optically transparent upper conductive layer formed on a lower surface thereof, and two upper electrodes connected to the optically transparent upper conductive layer at two edges along the X direction respectively. The lower substrate includes an optically transparent lower conductive layer formed on an upper surface thereof, and two lower electrodes connected to the optically transparent upper conductive layer at two edges along the Y direction respectively. The plurality of dot spacers is formed between the optically transparent upper conductive layer and the optically transparent lower conductive layer. The upper substrate is a transparent and flexible film/plate. The lower substrate is a transparent and rigid plate made of glass. The optically transparent upper conductive layer and the optically transparent lower conductive layer are formed of conductive indium tin oxide (ITO). The upper electrodes and the lower electrodes are formed by silver paste layers.

In operation, an upper surface of the upper substrate is pressed with a finger, a pen or the like tool, and visual observation of a screen on the display device provided on a back side of the touch panel is allowed. This causes the upper substrate to be deformed, and the upper conductive layer thus comes in contact with the lower conductive layer at the position where pressing occurs. Voltages are applied successively from an electronic circuit to the optically transparent upper conductive layer and the optically transparent lower conductive layer. Thus, the deformed position can be detected by the electronic circuit.

In roll-to-roll technology, e-papers, flexible liquid crystal displays, and flexible organic light emitting displays (OLEDs) have been developed. Accordingly, the touch panel used with the flexible display should be flexible too. However, the lower substrate of the touch panel is rigid and the ITO layer has generally poor mechanical durability, low chemical endurance, and uneven resistance over an entire area of the touch panel. As such, the conventional touch panel is unsuitable for use with a flexible display. Additionally, the ITO layer has relatively low transparency in a humid environment. All the above-mentioned problems of the ITO layer tend to yield a touch panel with relatively low sensitivity, accuracy, and brightness. Furthermore, the ITO layer is generally formed by means of ion-beam sputtering, and this method is relatively complicated.

What is needed, therefore, is to provide a flexible touch panel and a display device using the same having good durability, high sensitivity, accuracy, and brightness.

SUMMARY

In one embodiment, a touch panel includes a first electrode plate and a second electrode plate. The first electrode plate includes a first substrate, and a first conductive layer disposed on a lower surface of the first substrate. The second electrode plate is separated from the first electrode plate by spacers and/or an insulative layer. The second electrode plate also includes a second substrate, and a second conductive layer disposed on an upper surface of the second substrate. The first conductive layer and the second conductive layer both include a carbon nanotube layer. Each carbon nanotube layer includes a plurality of carbon nanotubes. The first substrate and the second substrate are flexible.

Other advantages and novel features of the present touch panel and the display device using the same will become more apparent from the following detailed description of exemplary embodiments when taken in conjunction with the accompanying drawings.

BRIEF DESCRIPTION OF THE DRAWINGS

Many aspects of the present touch panel and the display device using the same can be better understood with reference to the following drawings. The components in the drawings are not necessarily to scale, the emphasis instead being placed upon clearly illustrating the principles of the present touch panel and the display device using the same.

Corresponding reference characters indicate corresponding parts throughout the several views. The exemplifications set out herein illustrate at least one embodiment of the present touch panel, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present touch panel and the display device using the same.

Figure 1:
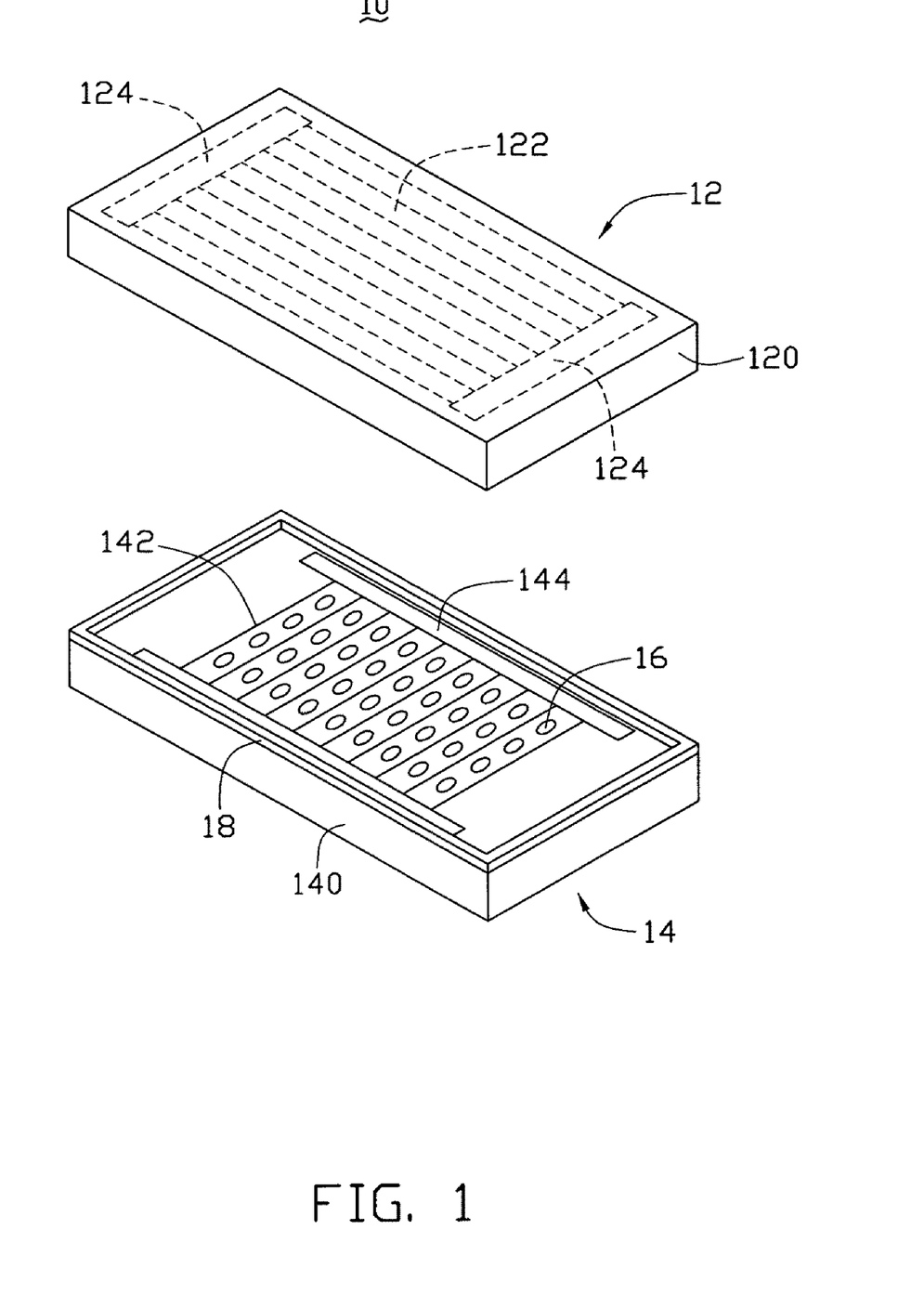
FIG. 1 is a schematic view of a partially assembled touch panel in accordance with a present embodiment.
Figure 2:
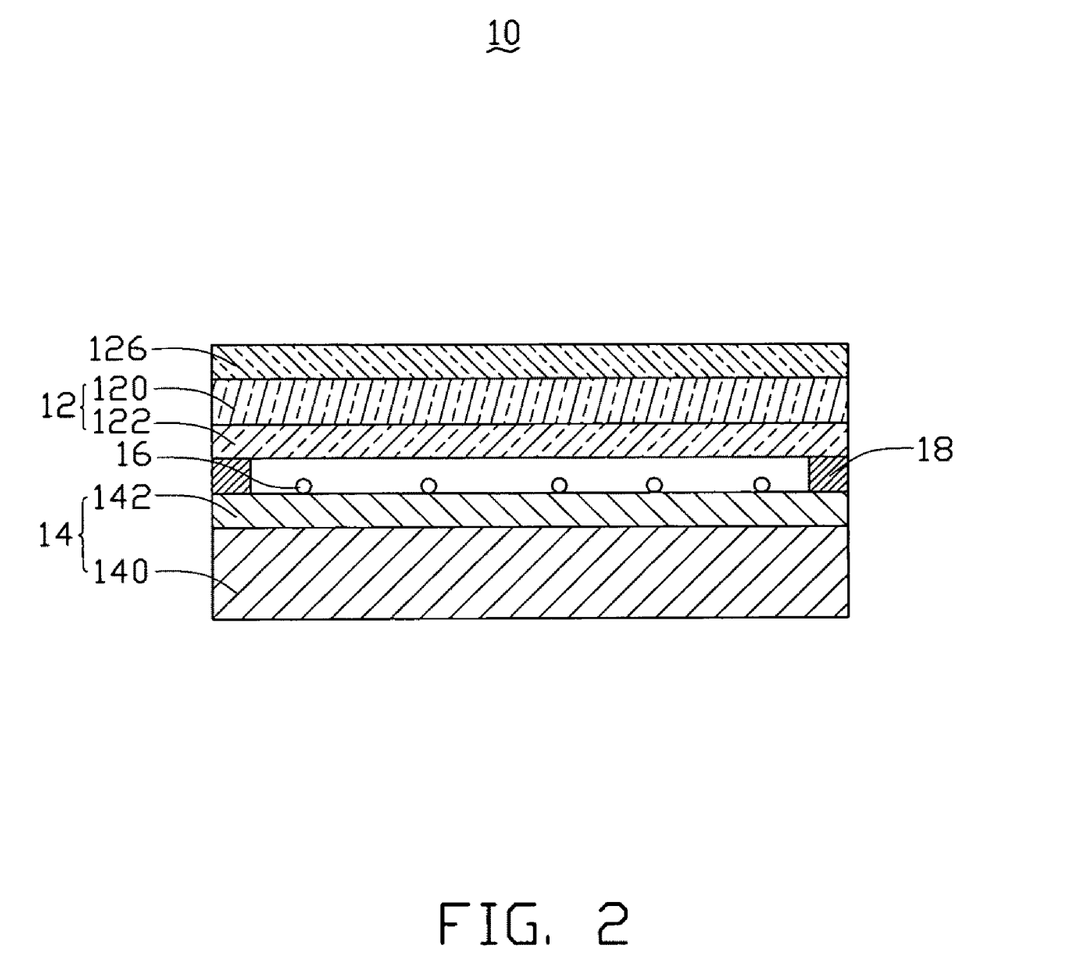
FIG. 2 is a cross-sectional view of the touch panel of FIG. 1.

Referring to FIG. 1 and FIG. 2, a touch panel 10 includes a first electrode plate 12, a second electrode plate 14, and a plurality of dot spacers 16 disposed between the first electrode plate 12 and the second electrode plate 14.

The first electrode plate 12 includes a first substrate 120, a first conductive layer 122, and two first-electrodes 124. The first substrate 120 includes an upper surface and a lower surface, each of which is substantially flat. The two first-electrodes 124 and the first conductive layer 122 are located on the lower surface of the first substrate 120. The two first-electrodes 124 are located separately on opposite ends of the first conductive layer 122. A direction from one of the first-electrodes 124 across the first conductive layer 122 to the other first electrode 124 is defined as a first direction. The two first-electrodes 124 are electrically connected with the first conductive layer 122.

The second electrode plate 14 includes a second substrate 140, a second conductive layer 142, and two second-electrodes 144. The second substrate 140 includes an upper surface and a lower surface, each of which is substantially flat. The two second-electrodes 144 and the second conductive layer 142 are located on the upper surface of the second substrate 140. The two second-electrodes 144 are located separately on opposite ends of the second conductive layer 142. A direction from one of the second-electrodes 144 across the second conductive layer 142 to the other second-electrodes 144 is defined as a second direction. The two second-electrodes 144 are electrically connected with the second conductive layer 142.

The first direction is perpendicular to the second direction (i.e., the two first-electrodes 124 are orthogonal to the two second-electrodes 144). That is, the two first-electrodes 144 are aligned parallel to the second direction, and the two second-electrodes 146 aligned parallel to the first direction.

The first substrate 120 and the second substrate 140 are transparent and flexible films/plates made of polymer, resin, or any other suitable flexible material. The material of the first substrate 120 and the second substrate 140 can be selected from a group consisting of polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, and acrylic resins. A thickness of the first substrate 120 and the second substrate 140 can be in the approximate range from 1 millimeter to 1 centimeter. In the present embodiment, the first substrate 120 and the second substrate 140 are made of PET, and the thickness thereof are both about 2 millimeters.

The first-electrodes 124 and the second-electrodes 144 can be formed by metallic layers, conductive resin layers, carbon nanotube films or any other suitable materials. In the present embodiment, the material of the first-electrodes 124 and the second-electrodes 144 is silver paste. It is noted that, the electrodes of the flexible touch panel should be tough but flexible.

In the present embodiment, the two first-electrodes 124 are disposed on opposite ends of the first conductive layer 122 along the first direction and electrically connected to the first conductive layer 122. The two second-electrodes 144 are disposed on opposite ends of the second conductive layer 142 along the second direction and electrically connected to the second conductive layer 142. It is to be understood that the first-electrodes 124 and the second-electrodes 144 can be respectively disposed either on the first conductive layer 122 and the second conductive layer 142, or on the first substrate 120 and the second substrate 140.

An insulative layer 18 is provided between the first and the second electrode plates 12 and 14. The first electrode plate 12 is located on the insulative layer 18. The first conductive layer 122 is opposite to, but is spaced from, the second conductive layer 142. The dot spacers 16 are located on the second conductive layer 142. A distance between the second electrode plate 14 and the first electrode plate 12 is in an approximate range from 2 to 20 microns. The insulative layer 18 and the dot spacers 16 are made of, for example, insulative resin or any other suitable insulative material. Insulation between the first electrode plate 12 and the second electrode plate 14 is provided by the insulative layer 18 and the dot spacers 16. It is to be understood that the dot spacers 16 are optional, particularly when the touch panel 10 is relatively small. They serve as supports given the size of the span and the strength of the first electrode plate 12.

In the present embodiment, a transparent protective film 126 is disposed on the upper surface of the first electrode plate 12. The transparent protective film 126 can be a film that receives a surface hardening treatment to protect the first electrode plate 12 from being scratched when in use. The transparent protective film 126 can be adhered to the upper surface of the first electrode plate 12 or combined with the first electrode plate 12 by a hot-pressing method. The transparent protective film 126 can be plastic or resin. The material of the resin film can be selected from a group consisting of BCB, polyesters, acrylic resins, PET, and any combination thereof. In the present embodiment, the material of the transparent protective film 126 is PET.

Either the first conductive layer 122 or the second conductive layer 142 includes a transparent carbon nanotube layer. The carbon nanotube layer can include one or a plurality of transparent carbon nanotube films. It is to be understood that the size of the touch panel 10 is not confined by the size of the carbon nanotube films. When the size of the carbon nanotube films is smaller than the desired size of the touch panel 10, a plurality of carbon nanotube films can be coplanar, disposed side by side or overlapping to cover the entire surface of the first substrate 120 and the second substrate 140. Thus, the size of the touch panel 10 can be set as desired. A thickness of the carbon nanotube layer is set in a range where the carbon nanotube layer has an acceptable transparency. Alignment direction of the carbon nanotube films is set as desired.

The carbon nanotube film is formed by a plurality of carbon nanotubes, ordered or otherwise, and has a uniform thickness. The carbon nanotube film can be an ordered film or a disordered film. In the ordered film, the carbon nanotubes are primarily oriented along a same direction in each film. Different stratums/layers of films can have the nanotubes offset from the nanotubes in other films. In the disordered film, the carbon nanotubes are disordered or isotropic. The disordered carbon nanotubes entangle with each other. The isotropic carbon nanotubes are substantially parallel to a surface of the carbon nanotube film.

Length and width of the carbon nanotube film can be arbitrarily set as desired. A thickness of the carbon nanotube film is in an approximate range from 0.5 nanometers to 100 micrometers. The carbon nanotubes in the carbon nanotube film include single-walled, double-walled, or multi-walled carbon nanotubes. Diameters of the single-walled carbon nanotubes, the double-walled carbon nanotubes, and the multi-walled carbon nanotubes can, respectively, be in the approximate range from 0.5 to 50 nanometers, 1 to 50 nanometers, and 1.5 to 50 nanometers.

Figure 3:
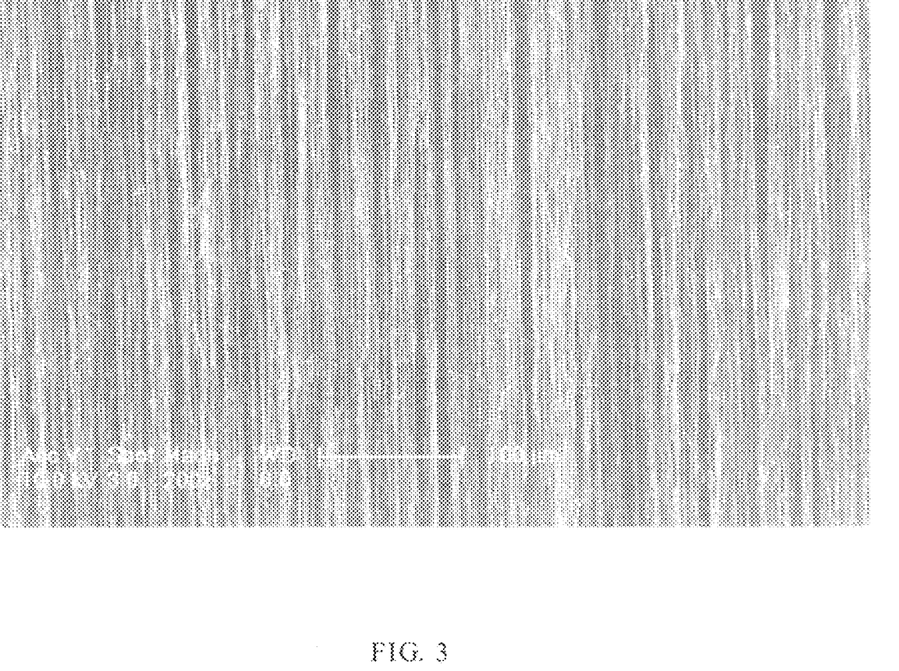
FIG. 3 shows a Scanning Electron Microscope (SEM) image of a carbon nanotube film used in the touch panel of FIG. 1.

In the present embodiment, the first conductive layer 122 and the second conductive layer 142 are carbon nanotube layers. The carbon nanotubes in the first conductive layer 122 are arranged along the first direction. The carbon nanotubes in the second conductive layer 142 are arranged along the second direction. The first direction is perpendicular to the second direction. As shown in FIG. 3, the majority of nanotubes are arraigned along a primary direction; however, the orientation of some of the nanotubes may vary. Each carbon nanotube layer may include a plurality of stacked carbon nanotube films aligned along a same direction. In each layer, the carbon nanotubes of the carbon nanotube films are aligned along a substantially same direction (i.e., the carbon nanotube film is the ordered film). More specifically, in each layer, each carbon nanotube film includes a plurality of successive and oriented carbon nanotubes joined end to end by van der Waals attractive force.

Figure 4:
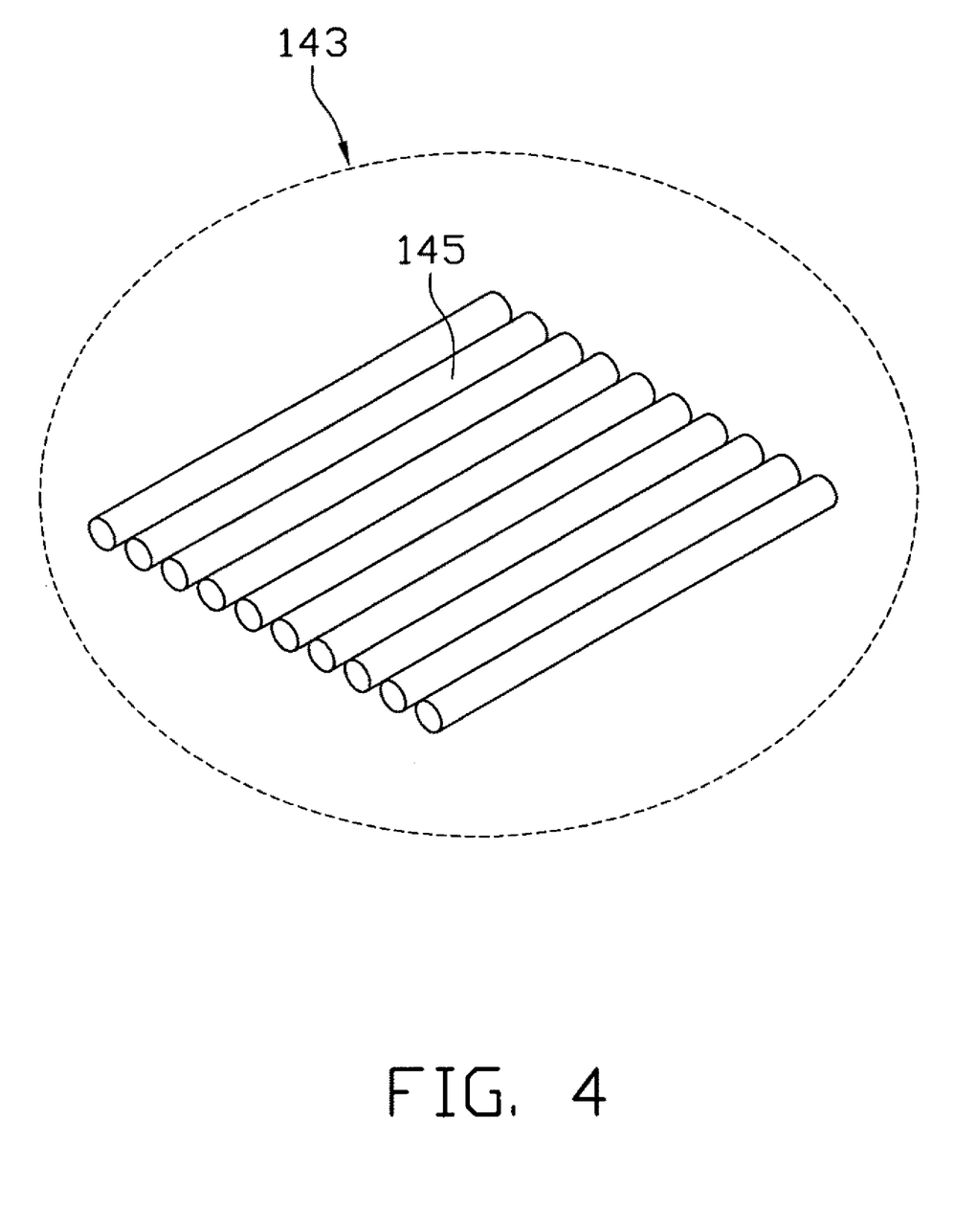
FIG. 4 is a structural schematic of a carbon nanotube segment.

Referring to FIGS. 3 and 4, each carbon nanotube film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation.

A method for fabricating the above-described carbon nanotube film of the present embodiment includes the steps of: (a) providing an array of carbon nanotubes, specifically providing a super-aligned array of carbon nanotubes; and (b) pulling out a carbon nanotube film from the array of carbon nanotubes, by using a tool (e.g., adhesive tape, pliers, tweezers, or another tool allowing multiple carbon nanotubes to be gripped and pulled simultaneously).

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. A 4-inch P-type silicon wafer is used as the substrate in the present embodiment.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters. The super-aligned array includes a plurality of carbon nanotubes parallel to each other and approximately perpendicular to the substrate. The carbon nanotubes in the array can be multi-walled carbon nanotubes, double-walled carbon nanotubes, or single-walled carbon nanotubes. Diameters of the multi-walled carbon nanotubes are in the approximate range from 1.5 nanometers to 50 nanometers. Diameters of the double-walled carbon nanotubes are in the approximate range from 1 nanometer to 50 nanometers. Diameters of the single-walled carbon nanotubes are in the approximate range from 0.5 nanometers to 10 nanometers.

The super-aligned array of carbon nanotubes formed under the above conditions is essentially free of impurities such as carbonaceous or residual catalyst particles. The carbon nanotubes in the super-aligned array are closely packed together by van der Waals attractive force.

In step (b), the carbon nanotube film can be formed by the substeps of: (b1) selecting one or more carbon nanotube having a predetermined width from the super-aligned array of carbon nanotubes; and (b2) pulling the carbon nanotubes to form carbon nanotube segments at an even/uniform speed to achieve a uniform carbon nanotube film.

In step (b1), the carbon nanotube segments having a predetermined width can be selected by using an adhesive tape as the tool to contact the super-aligned array. Each carbon nanotube segment includes a plurality of carbon nanotubes parallel to each other. In step (b2), the pulling direction is substantially perpendicular to the growing direction of the super-aligned array of carbon nanotubes.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube film having a predetermined width can be formed. Referring to FIG. 3, the carbon nanotube film includes a plurality of carbon nanotubes joined ends to ends. The carbon nanotubes in the carbon nanotube film are all substantially parallel to the pulling/drawing direction of the carbon nanotube film, and the carbon nanotube film produced in such manner can be selectively formed to have a predetermined width. The carbon nanotube film formed by the pulling/drawing method has superior uniformity of thickness and conductivity over a typical disordered carbon nanotube film. Further, the pulling/drawing method is simple, fast, and suitable for industrial applications.

The width of the carbon nanotube film depends on a size of the carbon nanotube array. The length of the carbon nanotube film can be arbitrarily set, as desired. In one useful embodiment, when the substrate is a 4-inch P-type silicon wafer as in the present embodiment, the width of the carbon nanotube film is in an approximate range from 0.01 centimeter to 10 centimeters, and the thickness of the carbon nanotube film is in an approximate range from 0.5 nanometers to 100 microns. The carbon nanotubes in the carbon nanotube film includes single-walled carbon nanotubes, double-walled carbon nanotubes, or multi-walled carbon nanotubes. Diameters of the single-walled carbon nanotubes, the double-walled carbon nanotubes, and the multi-walled carbon nanotubes can, respectively, be in an approximate range from 0.5 to 50 nanometers, 1 to 50 nanometers, and 1.5 to 50 nanometers.

It is noted that because the carbon nanotubes in the super-aligned carbon nanotube array have a high purity and a high specific surface area, the carbon nanotube film is adherent in nature. As such, the at least one carbon nanotube film can be directly adhered to a surface of the first substrate 120, the second substrate 140, and/or another carbon nanotube film, and electrically connect to the two first-electrodes 124 and the two second-electrodes 144 to form the first conductive layer 122 and the second conductive layer 142. In the alternative, other bonding means can be applied.

It is to be understood that, a plurality of carbon nanotube films can be adhered to a surface of the first substrate 120 and the second substrate 140 and can be stacked on each other to form the two carbon nanotube layers. The number of the films and the angle between the aligned directions of two adjacent films can be set as desired. When the carbon nanotube films are adhered along a same direction, the carbon nanotubes in the whole carbon nanotube layer are arranged along the same direction. When the carbon nanotube films are adhered along different directions, an angle α between the alignment directions of the carbon nanotubes in each two adjacent carbon nanotube films is in the range $0<\alpha\leq90°$. The angle α is the difference in the two pulling directions of the adjacent carbon nanotube films. The adjacent carbon nanotube films are combined by van de Waals attractive force to form a stable carbon nanotube layer. In the present embodiment, a plurality of carbon nanotube films are adhered on the first substrate 120 along the first direction and electrically connected to the two first-electrodes 124 to form the first conductive layer 122, and adhered on the second substrate 140 along the second direction and electrically connected to the two second-electrodes 144 to form the second conductive layer 142.

An additional step of treating the carbon nanotube films in the touch panel 10 with an organic solvent can be further provided. Specifically, the carbon nanotube film can be treated by applying organic solvent to the carbon nanotube film to soak the entire surface of the carbon nanotube film. The organic solvent is volatile and can, suitably, be selected from the group consisting of ethanol, methanol, acetone, dichloroethane, chloroform, any appropriate mixture thereof. In the present embodiment, the organic solvent is ethanol. After being soaked by the organic solvent, microscopically, carbon nanotube strings will be formed by adjacent carbon nanotubes in the carbon nanotube film, that are able to do so, bundling together, due to the surface tension of the organic solvent. In one aspect, part of the carbon nanotubes in the untreated carbon nanotube film that are not adhered on the substrate will come into contact with the substrate 120,140 after the organic solvent treatment due to the surface tension of the organic solvent. Then the contacting area of the carbon nanotube film with the substrate will increase, and thus, the carbon nanotube film can firmly adhere to the surface of the substrate 120,140. In another aspect, due to the decrease of the specific surface area via bundling, the mechanical strength and toughness of the carbon nanotube film are increased and the coefficient of friction of the carbon nanotube films is reduced. Macroscopically, the film will be an approximately uniform carbon nanotube film.

The touch panel 10 can further include a shielding layer (not shown) disposed on the lower surface of the second substrate 140. The material of the shielding layer can be conductive resin films, carbon nanotube films, or other flexible and conductive films. In the present embodiment, the shielding layer is a carbon nanotube film. The carbon nanotube film includes a plurality of carbon nanotubes, and the alignment of the carbon nanotubes therein can be set as desired. In the present embodiment, the carbon nanotubes in the carbon nanotube film of the shielding layer can be arranged along a same direction. The carbon nanotube film is connected to the ground and plays a role of shielding, and, thus, enables the touch panel 10 to operate without interference (e.g., electromagnetic interference).

Figure 5:
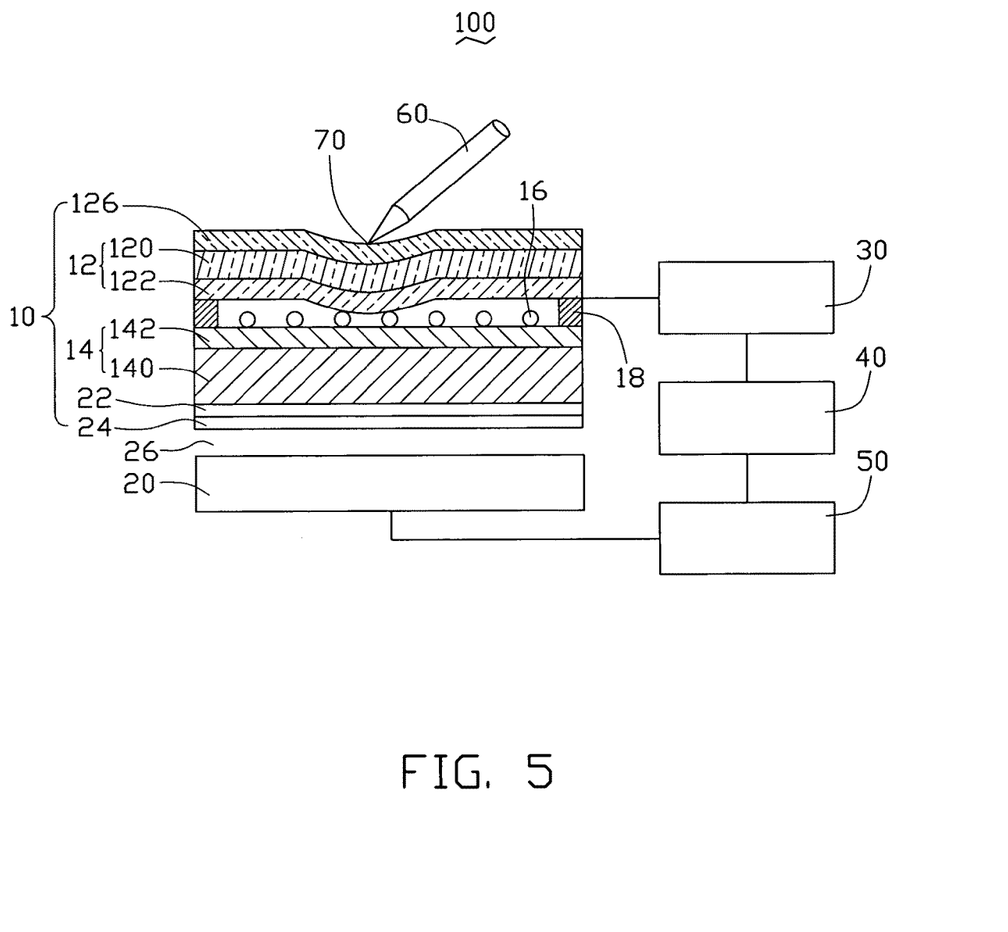
FIG. 5 is a schematic assembled cross-sectional view of the touch panel of the present embodiment used with a display element of a display device.

Referring to FIG. 5, a display device 100 includes the touch panel 10, a display element 20, a first controller 30, a central processing unit (CPU) 40, and a second controller 50. The touch panel 10 is opposite and adjacent to the display element 20 and is connected to the first controller 30 by an external circuit. The touch panel 10 can be spaced at a distance from the display element 20 or can be installed directly on the display element 20. The first controller 30, the CPU 40, and the second controller 50 are electrically connected. The display element 20 is electrically connected to the second controller. As such, the CPU 40 is connected to the second controller 50 to control the display element 20.

The display element 20 can be an e-paper (i.e., a microencapsulated electrophoretic display), a flexible liquid crystal display, a flexible organic light emitting display (OLED), or any other flexible display. Apparently, the display element 20 can also be a conventional display such as liquid crystal display, field emission display, plasma display, electroluminescent display, vacuum fluorescent display, cathode ray tube, or another display device.

When the touch panel 10 includes a shielding layer 22, a passivation layer 24 can be disposed on a surface of the shielding layer 22, facing away from the second substrate 140. The material of the passivation layer 24 can be selected from a group consisting of benzocyclobutenes, polyesters, acrylic resins, polyethylene terephthalate, and any combination thereof. The passivation layer 24 can be spaced at a certain distance from the display element 20 or can be directly installed on the display element 20. When the passivation layer 24 is spaced at a distance from the display element 30, understandably, two or more spacers can be used. Thereby, a gap 26 is provided between the passivation layer 24 and the display element 20. The passivation layer 24 protect the shielding layer 22 from chemical damage (e.g., humidity of the surrounding) or mechanical damage (e.g., scratching during fabrication of the touch panel).

In operation, a voltage of 5V is respectively applied to the two first-electrodes 124 of the first electrode plate 12 and the two second-electrodes 144 of the second electrode plate 14. A user operates the display by pressing the first electrode plate 12 of the touch panel 10 with a finger, a pen 60, or the like while visually observing the display element 20 through the touch panel. This pressing causes a deformation 70 of the first electrode plate 12. The deformation 70 of the first electrode plate 12 causes a connection between the first conductive layer 122 and the second conduction layer 142 of the second electrode plate 14. Changes in voltages in the first direction of the first conductive layer 142 and the second direction of the second conductive layer 142 can be detected by the first controller 30. Then, the first controller 30 transforms the changes in voltages into coordinates of the pressing point and sends the coordinates thereof to the CPU 40. The CPU 40 then sends out commands according to the coordinates of the pressing point and controls the display of the display element 20 by the second controller 30.

The properties of the carbon nanotubes provide superior toughness, high mechanical strength, and uniform conductivity to the carbon nanotube film and the carbon nanotube layer. Thus, the touch panel and the flexible display device using the same adopting the carbon nanotube layer are durable and highly conductive. The carbon nanotube film includes a plurality of successively oriented carbon nanotubes joined end to end by van der Waals attractive force therebetween. As such, the carbon nanotube film is flexible, and suitable for using as the conductive layer in a flexible touch panel. Further, the pulling method for fabricating each carbon nanotube film is simple, and the adhesive carbon nanotube film can be disposed on the substrate directly. As such, the method for fabricating the carbon nanotube film is suitable for the mass production of touch panels and display devices using the same and reduces the costs thereof. Furthermore, the carbon nanotube film has a high transparency, thereby promoting improved brightness of the touch panel and the display devices using the same. Additionally, since the carbon nanotubes have excellent electrical conductivity properties, the carbon nanotube layer formed by a plurality of carbon nanotubes has a uniform resistance distribution. Thus the touch panel and the display device adopting the carbon nanotube layer have improved sensitivity and accuracy.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A touch panel comprising:
   a first electrode plate comprising a first substrate and a first conductive layer disposed on a lower surface of the first substrate; and
   a second electrode plate spaced from the first electrode plate and comprising a second substrate and a second conductive layer disposed on an upper surface of the second substrate; and
   wherein the first conductive layer comprises at least one free standing and self-adhesive carbon nanotube film consisting of a plurality of carbon nanotubes, the at least one free standing and self-adhesive carbon nanotube film is directly adhered to the first substrate by a self-adhesive property of the at least one free standing and self-adhesive carbon nanotube film, the at least one free standing and self-adhesive carbon nanotube film comprises a plurality of ordered and successive carbon nanotube segments, the plurality of ordered and successive carbon nanotube segments is joined end to end by the van der Waals attractive force and comprises a plurality of carbon nanotubes primarily oriented along a same direction, and both the first substrate and the second substrate are flexible.

2. The touch panel as claimed in claim 1, wherein the at least one free standing and self-adhesive carbon nanotube film comprises of directly stacked carbon nanotube films.

3. The touch panel as claimed in claim 1, wherein the plurality of carbon nanotubes in the at least one free standing and self-adhesive carbon nanotube film are substantially parallel to a surface of the at least one free standing and self-adhesive carbon nanotube film.

4. The touch panel as claimed in claim 2, wherein an angle between the direction of the plurality of carbon nanotubes of two adjacent carbon nanotube films is greater than 0° and up to 90°.

5. The touch panel as claimed in claim 2, wherein a thickness of the at least one free standing and self-adhesive carbon nanotube film is in an approximate range from 0.5 nanometers to 100 microns, and a width of the at least one free standing and self-adhesive carbon nanotube film is in an approximate range from 0.01 centimeter to 10 centimeters.

6. The touch panel as claimed in claim 1, wherein a material of the first substrate and the second substrate is selected from the group consisting of polycarbonate, polymethyl methacrylate acrylic, polyethylene terephthalate, polyether polysulfones, polyvinyl polychloride, benzocyclobutenes, polyesters, and acrylic resins.

7. The touch panel as claimed in claim 1, wherein the first electrode plate further comprises two first-electrodes disposed on opposite ends of the first conductive layer along a first direction, the two first-electrodes being electrically connected to the first conductive layer, the plurality of carbon nanotubes in the first conductive layer are oriented along the first direction.

8. The touch panel as claimed in claim 7, wherein the second electrode plate further comprises two second-electrodes disposed on opposite ends of the second conductive layer along a second direction, the two second-electrodes being electrically connected to the second conductive layer, the plurality of carbon nanotubes in the second conductive layer are oriented along the second direction.

9. The touch panel as claimed in claim 8, wherein the first direction is perpendicular to the second direction.

10. The touch panel as claimed in claim 1, further comprising an insulative layer and a plurality of dot spacers, the insulative layer is disposed between the first electrode plate and the second electrode plate to insulate the first electrode plate from the second electrode plate, the dot spacers are disposed on the second conductive layer between the first electrode plate and the second electrode plate.

11. The touch panel as claimed in claim 1, further comprising a shielding layer disposed on a lower surface of the second substrate, and the material of the shielding layer being selected from the group consisting of conductive resin films, carbon nanotube films, and any combination thereof.

12. The touch panel as claimed in claim 1, further comprising a transparent protective film disposed on an upper surface of the first electrode plate, and the material of the transparent protective film being selected from the group consisting of benzocyclobutenes, polyesters, acrylic resins, polyethylene terephthalate, and any combination thereof.

13. A touch panel comprising:
a first electrode plate comprising a first substrate, a first conductive layer disposed on a lower surface of the first substrate, and two first-electrodes disposed on opposite ends of the first conductive layer, a direction from one of the two first-electrodes across the first conductive layer to the other of the two first-electrodes is defined as a first direction; and
a second electrode plate spaced from the first electrode plate and comprising a second substrate, a second conductive layer disposed on an upper surface of the second substrate, and two second-electrodes disposed on opposite ends of the second conductive layer, a direction from one of the two second-electrodes across the second conductive layer to the other of the two second-electrodes being defined as a second direction;
wherein the first conductive layer comprises a first carbon nanotube film, the first carbon nanotube film comprises a plurality of first carbon nanotubes, the second conductive layer comprises a second carbon nanotube film, the second carbon nanotube film comprises a plurality of second carbon nanotubes, the plurality of first carbon nanotubes in the first conductive layer is arranged along the first direction, and the plurality of second carbon nanotubes in the second conductive layer is arranged along the second direction, and both the first substrate and the second substrate are flexible.

14. The touch panel as claimed in claim 13, wherein the first direction is substantially perpendicular to the second direction.

15. A touch panel comprising:
a first electrode plate comprising a first substrate and a first conductive layer disposed on a lower surface of the first substrate; and
a second electrode plate spaced from the first electrode plate and comprising a second substrate and a second conductive layer disposed on an upper surface of the second substrate; and
wherein the first conductive layer and the second conductive layer both comprise at least one carbon nanotube film, the at least one carbon nanotube film comprises a plurality of carbon nanotube segments joined end to end by the van der Waals attractive force, each of the plurality of carbon nanotube segments comprises a plurality of carbon nanotubes primarily oriented along a same direction, and both the first substrate and the second substrate are flexible.

* * * * *